(12) United States Patent
Lee et al.

(10) Patent No.: US 11,906,216 B2
(45) Date of Patent: Feb. 20, 2024

(54) VEHICULAR HEAT MANAGEMENT SYSTEM

(71) Applicant: Hanon Systems, Daejeon (KR)

(72) Inventors: Jun Min Lee, Daejeon (KR); Yong Sik Kim, Daejeon (KR); Chul Hee Kim, Daejeon (KR); Byeong Ha Lee, Daejeon (KR); Jae O Jung, Daejeon (KR); Jin Jae Lee, Daejeon (KR); Doo Hoon Kim, Daejeon (KR); Kyung Ju An, Daejeon (KR); Joong Man Han, Daejeon (KR)

(73) Assignee: Hanon Systems, Daejeon (KR)

( * ) Notice: Subject to any disclaimer, the term of this patent is extended or adjusted under 35 U.S.C. 154(b) by 338 days.

(21) Appl. No.: 17/598,036

(22) PCT Filed: Mar. 31, 2020

(86) PCT No.: PCT/KR2020/004395
§ 371 (c)(1),
(2) Date: Sep. 24, 2021

(87) PCT Pub. No.: WO2020/204570
PCT Pub. Date: Oct. 8, 2020

(65) Prior Publication Data
US 2022/0176776 A1 Jun. 9, 2022

(30) Foreign Application Priority Data

Apr. 5, 2019 (KR) .......... 10-2019-0039897
Jan. 21, 2020 (KR) .......... 10-2020-0008098

(51) Int. Cl.
F25B 41/24 (2021.01)
F25B 41/20 (2021.01)
(Continued)

(52) U.S. Cl.
CPC ......... *F25B 41/24* (2021.01); *B60H 1/00278* (2013.01); *B60H 1/00385* (2013.01);
(Continued)

(58) Field of Classification Search
CPC ...... F25B 41/24; F25B 41/20; B60H 1/00885; B60H 1/00899; B60H 2001/00942
See application file for complete search history.

(56) References Cited

U.S. PATENT DOCUMENTS 11,541,718 B2 * 1/2023 Lee ............... B60H 1/2218
2018/0312036 A1 * 11/2018 Kim ............... B60H 1/00921
(Continued)

FOREIGN PATENT DOCUMENTS

JP 2014-156143 A 8/2014
KR 20140001318 A 1/2014
(Continued)

*Primary Examiner* — Jon T. Schermerhorn, Jr.
(74) *Attorney, Agent, or Firm* — Norton Rose Fulbright US LLP; James R. Crawford

(57) ABSTRACT

A vehicular heat management system is provided with a heat pump type refrigerant circulation line that cools and heats specific air conditioning regions by generating a hot air or a cold air depending on a flow direction of a refrigerant. The system includes a compressor configured to suck, compress and discharge the refrigerant, a high-pressure side heat exchanger configured to dissipate heat of the refrigerant discharged from the compressor, an outdoor heat exchanger configured to allow the refrigerant to exchange heat with an air outside the vehicle, an expansion valve configured to depressurize the refrigerant flowing out of the high-pressure side heat exchanger or the outdoor heat exchanger, and one or more low-pressure side heat exchangers configured to evaporate the depressurized refrigerant. The outdoor heat
(Continued)

exchanger and the low-pressure side heat exchangers are connected in series or in parallel depending on an air conditioning mode.

22 Claims, 16 Drawing Sheets

(51) Int. Cl.
*B60H 1/00* (2006.01)
*B60H 1/22* (2006.01)
*B60L 58/26* (2019.01)

(52) U.S. Cl.
CPC ..... *B60H 1/00485* (2013.01); *B60H 1/00885* (2013.01); *B60H 1/00899* (2013.01); *B60H 1/2218* (2013.01); *B60H 1/2221* (2013.01); *F25B 41/20* (2021.01); *B60H 2001/00942* (2013.01); *B60H 2001/00949* (2013.01); *B60H 2001/00961* (2019.05); *B60L 58/26* (2019.02)

(56) References Cited

U.S. PATENT DOCUMENTS

| | | | |
|---|---|---|---|
| 2020/0122544 A1* | 4/2020 | Ishizeki | B60H 1/143 |
| 2021/0300146 A1* | 9/2021 | Ishizeki | B60H 1/00278 |
| 2022/0009309 A1* | 1/2022 | Miura | B60H 1/32284 |

FOREIGN PATENT DOCUMENTS

| | | |
|---|---|---|
| KR | 101703604 B1 | 2/2017 |
| KR | 101748209 B1 | 6/2017 |
| KR | 20180007021 A | 1/2018 |

* cited by examiner

PRIOR ART

VEHICULAR HEAT MANAGEMENT SYSTEM

CROSS REFERENCE TO RELATED APPLICATIONS

This application is a national phase under 35 U.S.C. § 371 of International Application No. PCT/KR2020/004395 filed on Mar. 31, 2020, which claims the benefit of priority from Korean Patent Application Nos. 10-2019-0039897 filed on Apr. 5, 2019 and 10-2020-0008098 filed on Jan. 21, 2020. The entire contents of these applications are incorporated herein by reference in their entirety.

TECHNICAL FIELD

The present invention relates to a vehicular heat management system and, more particularly, to a vehicular heat management system capable of controlling the refrigerant flow between low-pressure side heat exchangers in series or in parallel according to the air conditioning mode state, independently controlling the flow rates of the refrigerant introduced into the respective low-pressure side heat exchangers according to the air conditioning mode state, and introducing the refrigerant into the respective low-pressure side heat exchangers at optimal flow rates suitable for the respective low-pressure side heat exchangers.

BACKGROUND ART

Examples of an eco-friendly vehicle include an electric vehicle, a hybrid vehicle and a fuel cell vehicle (hereinafter collectively referred to as a "vehicle").

As shown in FIG. 1, such a vehicle is equipped with an air conditioner 1 for cooling and heating air conditioning regions.

The air conditioner 1 is of a heat pump type and includes a refrigerant circulation line 3. The refrigerant circulation line 3 includes a compressor 3a, a high-pressure side heat exchanger 3b, a heat pump mode expansion valve 3c, an outdoor heat exchanger 3d, a plurality of air conditioning mode expansion valves 3e installed in parallel with each other, and low-pressure side heat exchangers 3f installed on the downstream side of the air conditioning mode expansion valves 3e.

This refrigerant circulation line 3 opens the heat pump mode expansion valve 3c in an air conditioning mode, so that the refrigerant can be circulated without going through the heat pump mode expansion valve 3c. Through this refrigerant circulation, a low-temperature cold air is generated in the low-pressure side heat exchangers 3f. The generated cold air is supplied to the air conditioning regions of the vehicle, for example, a passenger compartment and a battery 5. Accordingly, the passenger compartment and the battery 5 are cooled.

In a heat pump mode, by turning on the heat pump mode expansion valve 3c, the refrigerant can be circulated while passing through the heat pump mode expansion valve 3c. Through this refrigerant circulation, high-temperature heat is generated in the high-pressure side heat exchanger 3b. The generated heat is supplied into the passenger compartment to heat the passenger compartment.

In this conventional heat management system, specific heat exchangers 3d and 3f among the heat exchangers 3d and 3f of the refrigerant circulation line 3 are connected in series with each other. Such a series connection structure has a disadvantage in that the refrigerant pressure loss increases. This leads to a problem that the cooling performance of the heat exchangers 3d and 3f is significantly reduced.

In particular, the low-pressure side heat exchangers 3f are connected in series with the upstream side outdoor heat exchanger 3d. The low-pressure side heat exchangers 3f thus connected have a drawback that the refrigerant subjected to pressure loss while passing through the upstream side outdoor heat exchanger 3d is introduced into the low-pressure side heat exchangers 3f. This leads to a problem that the cooling performance of the low-pressure side heat exchangers 3f is lowered.

In addition, since the low-pressure side heat exchangers 3f have a structure in which the refrigerant that has passed through the upstream side outdoor heat exchanger 3d is introduced into the low-pressure side heat exchangers 3f, there is a disadvantage that the flow rate of the introduced refrigerant is inevitably limited due to the upstream side outdoor heat exchanger 3d.

Because of this disadvantage, there is a problem that the refrigerant cannot be introduced into the respective low-pressure side heat exchangers 3f at optimal flow rates suitable for the heat capacities possessed by the respective low-pressure side heat exchangers 3f. This leads to a drawback that the cooling performance of the respective low-pressure side heat exchangers 3f is lowered.

SUMMARY

In view of the problems inherent in the related art, it is an object of the present invention to provide a vehicular heat management system capable of improving the arrangement structure of heat exchangers and the refrigerant flow structure to consequently prevent the refrigerant pressure loss due to the series connection structure between the heat exchangers and the resultant deterioration of the cooling performance of the heat exchangers.

Another object of the present invention is to provide a vehicular heat management system capable of improving the arrangement structure of heat exchangers and the refrigerant flow structure to consequently introduce a refrigerant into low-pressure side heat exchangers at optimal flow rates suitable for the heat capacities possessed by the low-pressure side heat exchangers.

A further object of the present invention is to provide a vehicular heat management system capable of introducing a refrigerant into low-pressure side heat exchangers at an optimal flow rate to enable the heat exchangers to achieve optimum cooling performance and to improve the passenger compartment cooling performance.

In order to achieve these objects, there is provided a vehicular heat management system provided with a heat pump type refrigerant circulation line that cools and heats specific air conditioning regions by generating hot air or cold air depending on a flow direction of a refrigerant, including: a compressor configured to suck, compress and discharge the refrigerant; a high-pressure side heat exchanger configured to dissipate heat of the refrigerant discharged from the compressor; an outdoor heat exchanger configured to allow the refrigerant to exchange heat with an air outside the vehicle; an expansion valve configured to depressurize the refrigerant flowing out of the high-pressure side heat exchanger or the outdoor heat exchanger; and one or more low-pressure side heat exchangers configured to evaporate the depressurized refrigerant, wherein the outdoor heat exchanger and the low-pressure side heat exchangers are connected in series or in parallel depending on an air conditioning mode.

In the system, the outdoor heat exchanger and the low-pressure side heat exchangers may be connectable in parallel to each other on the refrigerant circulation line to operate independently of each other and may be connectable in series to each other to operate in association with each other.

In the system, the outdoor heat exchanger may be installed on the refrigerant circulation line, and the low-pressure side heat exchangers may be installed in parallel on a branch refrigerant line branched from the refrigerant circulation line and may be connected in parallel with the outdoor heat exchanger on the refrigerant circulation line.

The system may further include: a connection refrigerant line configured to connect the refrigerant circulation line on the downstream side of the outdoor heat exchanger and the branch refrigerant line on the upstream side of the low-pressure side heat exchangers, wherein the connection refrigerant line may be configured to connect the outdoor heat exchanger of the refrigerant circulation line and the low-pressure side heat exchangers of the branch refrigerant line in series.

The system may further include: a refrigerant flow controller configured to, depending on an air conditioning mode, control a refrigerant flow between the outdoor heat exchanger of the refrigerant circulation line and the low-pressure side heat exchangers of the branch refrigerant line in series or in parallel.

In the system, the refrigerant flow controller may include: variable expansion valves respectively installed on the upstream side of the outdoor heat exchanger and the low-pressure side heat exchangers to permit or block introduction of the refrigerant into the outdoor heat exchanger and the low-pressure side heat exchangers; an on/off valve installed in the branch refrigerant line to permit or block a refrigerant flow in a parallel structure of the low-pressure side heat exchangers of the branch refrigerant line with respect to the outdoor heat exchanger of the refrigerant circulation line; a refrigerant flow control valve installed in the refrigerant circulation line to permit or block a refrigerant flow in a series structure of the outdoor heat exchanger of the refrigerant circulation line and the low-pressure side heat exchangers of the branch refrigerant line; and a controller configured to control the variable expansion valves, the on/off valve and the refrigerant flow control valve so that the refrigerant flow between the outdoor heat exchanger of the refrigerant circulation line and the low-pressure side heat exchangers of the branch refrigerant line is controlled in series or in parallel depending on the air conditioning mode.

According to the vehicular heat management system of the present invention, the refrigerant flow between the heat exchangers is controlled in series or in parallel depending on the mode state of the air conditioner. Therefore, the flow rates of the refrigerant introduced into the respective heat exchangers can be controlled independently depending on the mode state of the air conditioner.

In addition, since the flow rates of the refrigerant introduced into the respective heat exchangers can be independently controlled, it is possible to introduce the refrigerant into the respective heat exchangers at optimum flow rates.

Moreover, since the refrigerant can be introduced into the respective heat exchangers at optimum flow rates, it is possible to optimally control the respective low-pressure side heat exchangers. As a result, the respective low-pressure side heat exchangers can exhibit optimal cooling performance, thereby significantly improving the cooling/heating performance.

DETAILED DESCRIPTION

Figure 1:
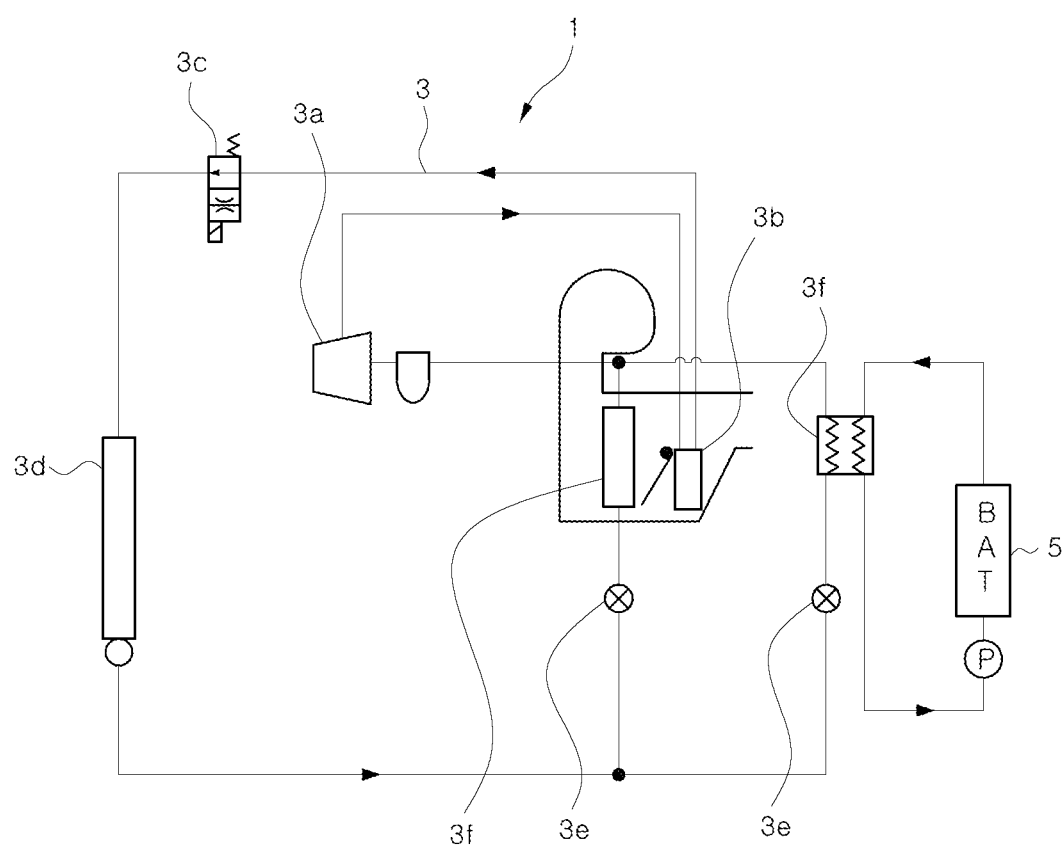
FIG. 1 is a view showing a conventional vehicular heat management system.

Preferred embodiments of a vehicular heat management system according to the present invention will now be described in detail with reference to the accompanying drawings.

First Embodiment

Prior to describing the features of the vehicular heat management system according to the present invention, the general configurations of the vehicular heat management system will be briefly described with reference to FIG. 2.

The vehicular heat management system includes an air conditioner 10 for cooling and heating air conditioning regions of a vehicle. The air conditioner 10 is of a heat pump type and includes a refrigerant circulation line 20.

The refrigerant circulation line 20 includes a compressor 22, a high-pressure side heat exchanger 24, a heat pump mode expansion valve 25, an outdoor heat exchanger 26, a plurality of air conditioning mode expansion valves 27 and 28, and low-pressure side heat exchangers 29 and 30 (hereinafter referred to as "first low-pressure side heat exchanger 29" and "second low-pressure side heat exchanger 30") installed on the downstream side of the air conditioning mode expansion valves 27 and 28, respectively.

The refrigerant circulation line 20 generates a low-temperature cold air in the first and second low-pressure side heat exchangers 29 and 30 in the air conditioning mode and supplies the generated cold air to the air conditioning regions of the vehicle, for example, a passenger compartment, a battery 40 and an electric component module 50.

In particular, the cold air generated in the first low-pressure side heat exchanger 29 is supplied to the passenger compartment to cool the passenger compartment, and the cold air generated in the second low-pressure side heat exchanger 30 is supplied to the battery 40 and the electric component module 50 to cool the battery 40 and the electric component module 50.

In a heat pump mode, high-temperature heat is generated in the high-pressure side heat exchanger 24, and the generated heat is supplied to the passenger compartment, thereby heating the passenger compartment.

In this regard, the second low-pressure side heat exchanger 30, the battery 40 and the electric component module 50 are connected to each other in a water-cooled manner through a cooling water circulation line 60.

In particular, the battery 40 and the electric component module 50 are connected in parallel to each other with respect to the second low-pressure side heat exchanger 30 through the cooling water circulation line 60. The battery 40 and the electric component module 50 thus connected are cooled by receiving the cold air from the second low-pressure side heat exchanger 30 through the cooling water circulated along the cooling water circulation line 60.

Next, the features of the vehicular heat management system according to the present invention will be described in detail with reference to FIGS. 2 to 11.

Figure 2:
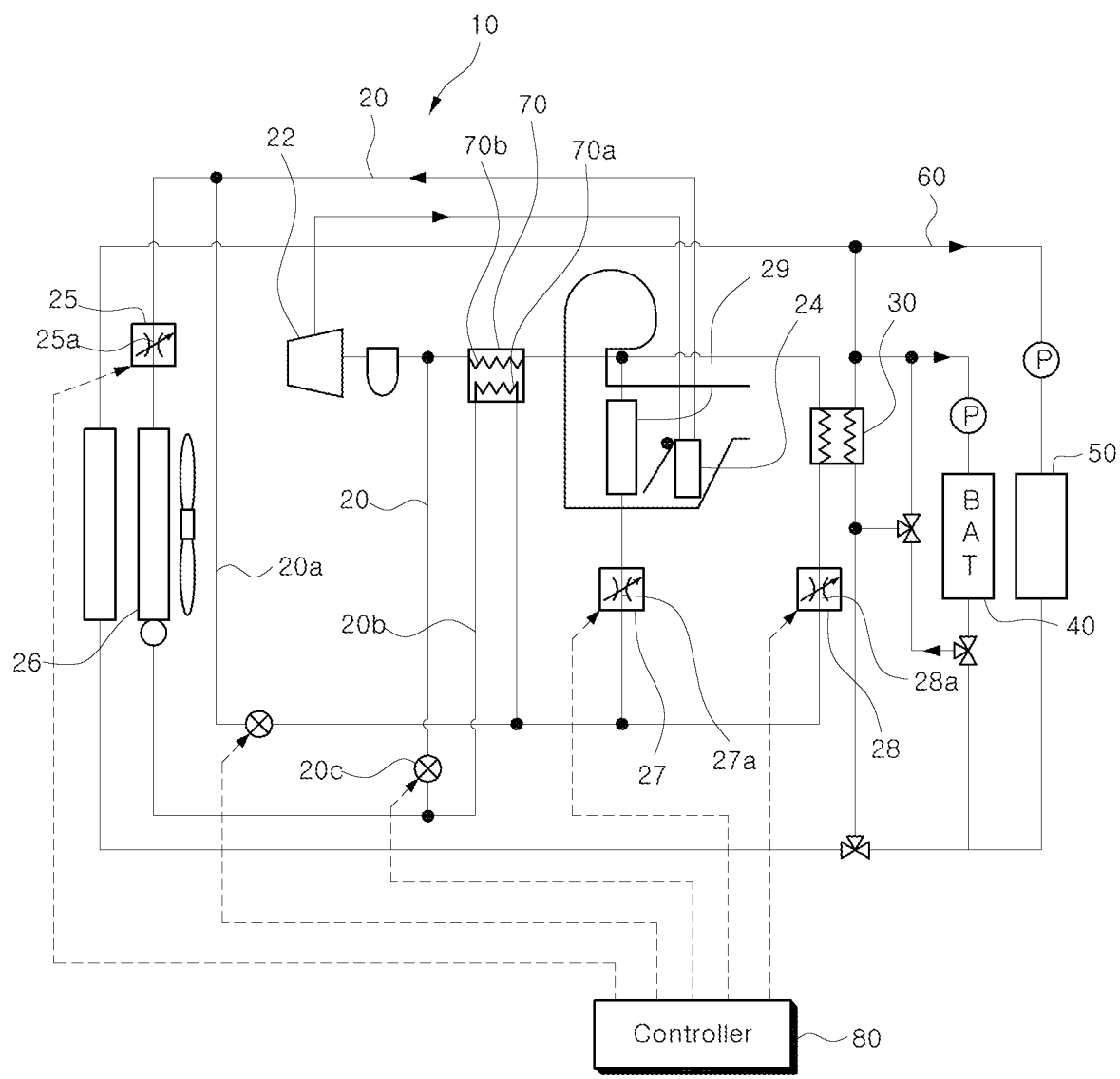
FIG. 2 is a view showing a vehicular heat management system according to a first embodiment of the present invention.
Figure 3:
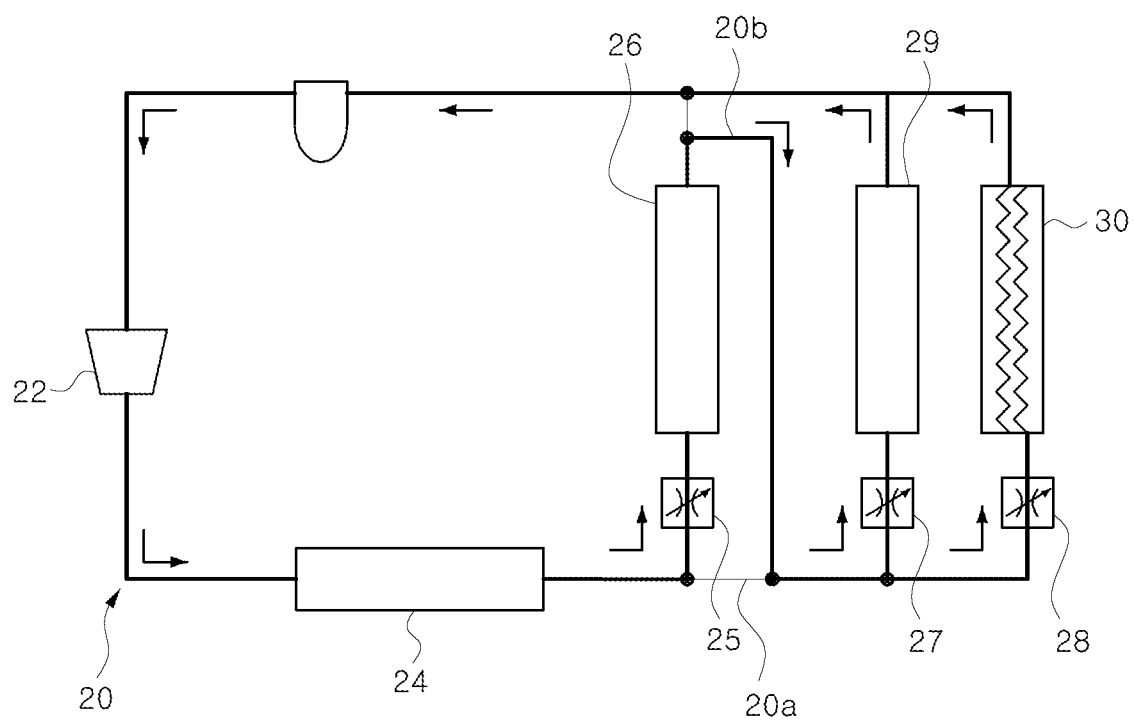
FIG. 3 is a view schematically illustrating the connection relationship between a compressor, a high-pressure side heat exchanger, an expansion valve, and a low-pressure side heat exchanger of the vehicular heat management system according to the first embodiment of the present invention, in which a refrigerant flow in a cooling mode and a battery cooling mode is shown.
Figure 4:
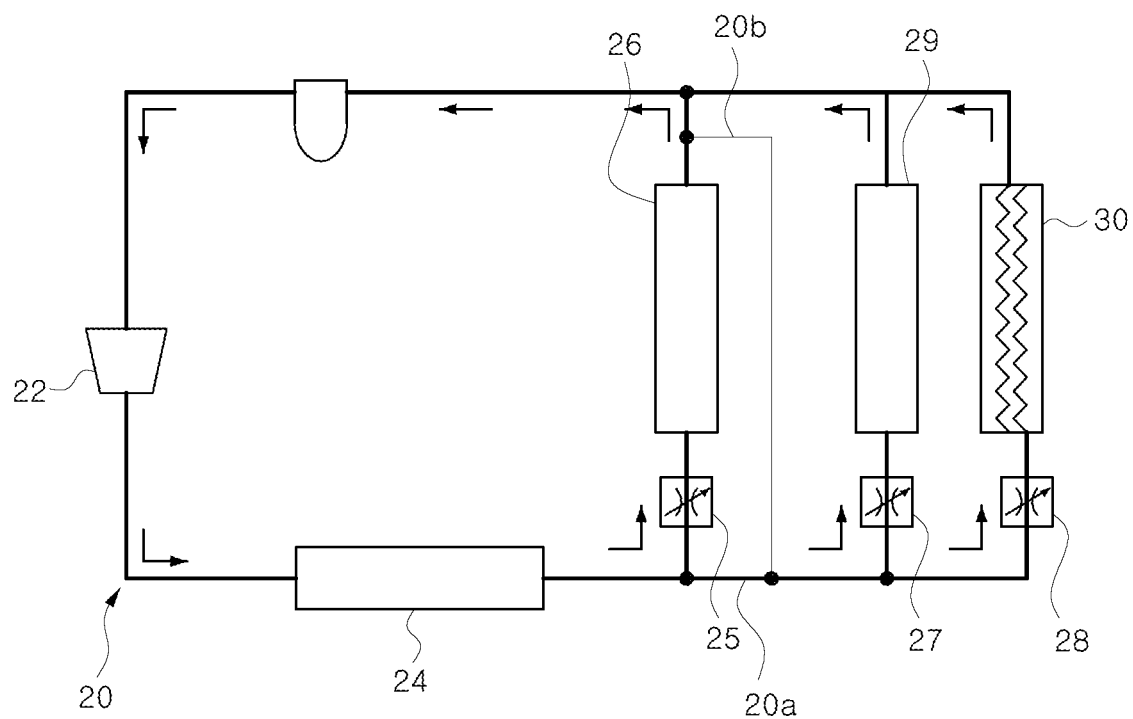
FIG. 4 is a view schematically illustrating the connection relationship between the compressor, the high-pressure side heat exchanger, the expansion valve, and the low-pressure side heat exchanger of the vehicular heat management system according to the first embodiment of the present invention, in which a refrigerant flow in a heating mode is shown.

Referring first to FIGS. 2, 3 and 4, the vehicular heat management system according to the present invention has a structure in which the outdoor heat exchanger 26 and the first and second low-pressure side heat exchangers 29 and 30 are connected in series or in parallel to each other depending on the mode state of the air conditioner 10.

More specifically, as shown in FIGS. 3 and 4, the vehicular heat management system has a structure in which the outdoor heat exchanger 26 and the first and second low-pressure side heat exchangers 29 and 30 are physically connected in parallel to each other.

In particular, the first and second low-pressure side heat exchangers 29 and 30 are connected in parallel to each other on a branch refrigerant line 20a branched from the refrigerant circulation line 20. The first and second low-pressure side heat exchangers 29 and 30 are connected in parallel to each other and connected in parallel to the outdoor heat exchanger 26.

As shown in FIG. 4, the outdoor heat exchanger 26 and the first and second low-pressure side heat exchangers 29 and 30 connected in parallel to each other in this way may independently introduce the refrigerant discharged from the high-side heat exchanger 24 as needed. As a result, the outdoor heat exchanger 26 and the first and second low-pressure side heat exchangers 29 and 30 may be operated independently of each other.

In particular, the outdoor heat exchanger 26 and the first and second low-pressure side heat exchangers 29 and 30 may independently introduce the refrigerant from the high-side heat exchanger 24 depending on the mode state of the air conditioner 10. Accordingly, depending on the mode state of the air conditioner 10, the outdoor heat exchanger 26 and the first and second low-pressure side heat exchangers 29 and 30 connected in parallel to each other may introduce the refrigerant at optimal flow rates suitable for the heat capacities thereof. As a result, the outdoor heat exchanger 26 and the first and second low-pressure side heat exchangers 29 and 30 can exhibit optimum cooling performance.

Referring to FIG. 2, an on/off valve 20a-1 is installed in the branch refrigerant line 20a on the upstream side of the first and second low-pressure side heat exchangers 29 and 30.

The on/off valve 20a-1 is operated in response to an applied control signal. When the outdoor heat exchanger 26 and the first and second low-pressure side heat exchangers 29 and 30 are not connected in parallel, the on/off valve 20a-1 cuts off the branch refrigerant line 20a.

Specifically, there may be a case where the outdoor heat exchanger 26 and the first and second low-pressure side heat exchangers 29 and 30 are not connected in parallel depending on the mode state of the air conditioner 10. For example, the outdoor heat exchanger 26 and the first and second low-pressure side heat exchangers 29 and 30 may be connected in series. In this case, the branch refrigerant line 20a is cut off.

Accordingly, the parallel connection between the outdoor heat exchanger 26 and the first and second low-pressure side heat exchangers 29 and 30 is limited.

Meanwhile, the outdoor heat exchanger 26 may be connected in series with the first and second low-pressure side heat exchangers 29 and 30. For this purpose, there is provided a connection refrigerant line 20b for connecting the outdoor heat exchanger 26 and the first and second low-pressure side heat exchangers 29 and 30 in series.

The connection refrigerant line 20b is branched from the refrigerant circulation line 20 on the downstream side of the outdoor heat exchanger 26 and is connected to the branch refrigerant line 20a on the upstream side of the first and second low-pressure side heat exchangers 29 and 30. As shown in FIG. 3, the connection refrigerant line 20b connects the downstream side of the outdoor heat exchanger 26 and the upstream side of the first and second low-pressure side heat exchangers 29 and 30.

Accordingly, the outdoor heat exchanger 26 and the first and second low-pressure side heat exchangers 29 and 30 can be connected in series. As a result, the refrigerant that has passed through the outdoor heat exchanger 26 can be introduced into the first and second low-pressure side heat exchangers 29 and 30.

Referring to FIG. 2, in the refrigerant circulation line 20 on the downstream side of the outdoor heat exchanger 26, there is installed a refrigerant flow control valve 20c for introducing the refrigerant that has passed through the outdoor heat exchanger 26 into the connection refrigerant line 20b as necessary.

The refrigerant flow control valve 20c is a solenoid type on/off valve, which is installed on the downstream side of the branch point of the connection refrigerant line 20b in the refrigerant circulation line 20. The refrigerant flow control valve 20c installed in this way opens and closes the refrigerant circulation line 20 on the downstream side of the branch point of the connection refrigerant line 20b while operating in response to an applied control signal.

Accordingly, the refrigerant that has passed through the outdoor heat exchanger 26 is circulated toward the compressor 22 or toward the first and second low-pressure side heat exchangers 29 and 30. Thus, the outdoor heat exchanger 26 and the first and second low-pressure side heat exchangers 29 and 30 can be connected in series if necessary.

Meanwhile, as shown in FIG. 2, the air conditioner 10 further includes an internal heat exchanger 70 that, when the outdoor heat exchanger 26 and the first and second low-pressure side heat exchangers 29 and 30 are connected in series, allows the high-temperature refrigerant supplied from the outdoor heat exchanger 26 to the first and second low-pressure side heat exchangers 29 and 30 and the low-temperature refrigerant supplied from the first and second low-pressure side heat exchangers 29 and 30 to the compressor 22 to exchange heat with each other.

The internal heat exchanger 70 has a double pipe structure and includes a first internal flow path 70a through which the high-temperature refrigerant supplied from the outdoor heat exchanger 26 to the first and second low-pressure side heat exchangers 29 and 30 passes and a second internal flow path 70b through which the low-temperature refrigerant supplied from the first and second low-pressure side heat exchangers 29 and 30 to the compressor 22 passes.

The first and second internal flow paths 70a and 70b are formed to correspond to each other and are configured to allow the high-temperature refrigerant supplied from the outdoor heat exchanger 26 to the first and second low-pressure side heat exchangers 29 and 30 and the low-temperature refrigerant supplied from the first and second low-pressure side heat exchangers 29 and 30 to the compressor 22 to exchange heat with each other.

Therefore, when the outdoor heat exchanger 26 and the first and second low-pressure side heat exchangers 29 and 30 are connected in series, the temperature of the refrigerant introduced from the outdoor heat exchanger 26 into the first and second low-pressure side heat exchangers 29 and 30 is further lowered. Accordingly, it is possible to improve the cooling efficiency of the first and second low-pressure side heat exchangers 29 and 30.

Referring again to FIG. 2, the vehicular heat management system according to the present invention further includes a refrigerant flow controller for controlling the refrigerant in the refrigerant circulation line 20 to pass through the outdoor heat exchanger 26 and the first and second low-pressure side heat exchangers 29 and 30 in series or to pass through the outdoor heat exchanger 26, the first low-pressure side heat exchanger 29 and the second low-pressure side heat exchanger 30 in parallel.

The refrigerant flow controller includes variable expansion valves 25, 27 and 28 installed on the upstream side of the outdoor heat exchanger 26 and the first and second low-pressure side heat exchangers 29 and 30, respectively, a refrigerant flow control valve 20c installed in the refrigerant circulation line 20 on the downstream side of the heat exchanger 26, and an on/off valve 20a-1 installed in the branch refrigerant line 20a on the upstream side of the first and second low-pressure side heat exchangers 29 and 30.

The variable expansion valves 25, 27 and 28 have throttle passage 25a, 27a and 28a whose opening degrees are variably adjusted according to the magnitude of the applied voltage. The variable expansion valves 25, 27 and 28 depressurize and expand the refrigerant introduced into the respective heat exchangers 26, 29 and 30 on the downstream side thereof, and block and permit the introduction of the refrigerant into the respective heat exchangers 26, 29 and 30. Accordingly, the variable expansion valves 25, 27 and 28 controls the refrigerant flow to the outdoor heat exchanger 26 and the first and second low-pressure side heat exchangers 29 and 30.

Depending on the mode state of the air conditioner 10, the variable expansion valves 25, 27 and 28 control the refrigerant flow toward the outdoor heat exchanger 26 and the first and second low-pressure side heat exchangers 29 and 30 in cooperation with the refrigerant flow control valve 20c and the on/off valve 20a-1. Thus, depending on the mode state of the air conditioner 10, the variable expansion valves 25, 27 and 28 control the refrigerant flow between the outdoor heat exchanger 26 and the first and second low-pressure side heat exchangers 29 and 30 in series or in parallel.

Figure 5:
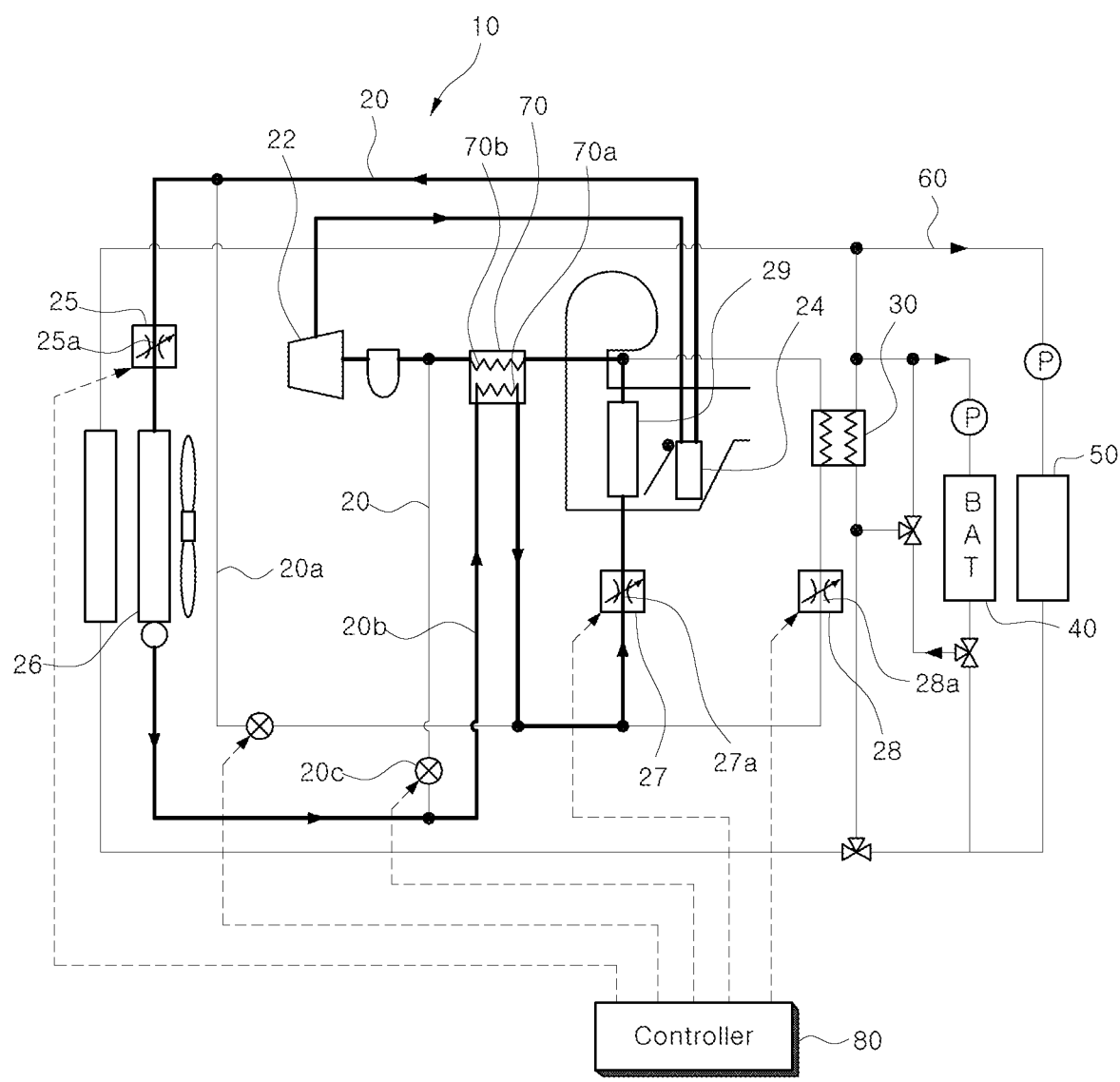
FIG. 5 is a view illustrating an operation example of the vehicular heat management system according to the first embodiment of the present invention, in which a refrigerant flow in a maximum air conditioning mode is shown.

Specifically, in the maximum air conditioning mode that requires maximum cooling in the passenger compartment, as shown in FIG. 5, the variable expansion valves 25, 27 and 28, the refrigerant flow control valve 20c and the on/off valve 20a-1 control the refrigerant flow in the refrigerant circulation line 20 to connect the outdoor heat exchanger 26 and the first low-pressure side heat exchanger 29 in series.

Therefore, in the maximum air conditioning mode, the outdoor heat exchanger 26 and the first low-pressure side heat exchanger 29 can be physically connected to each other.

Accordingly, the refrigerant in the refrigerant circulation line 20 can sequentially pass through the outdoor heat exchanger 26 and the first low-pressure side heat exchanger 29, whereby cold air can be generated from the first low-pressure side heat exchanger 29. As a result, the passenger compartment can be cooled to the maximum.

Figure 6:
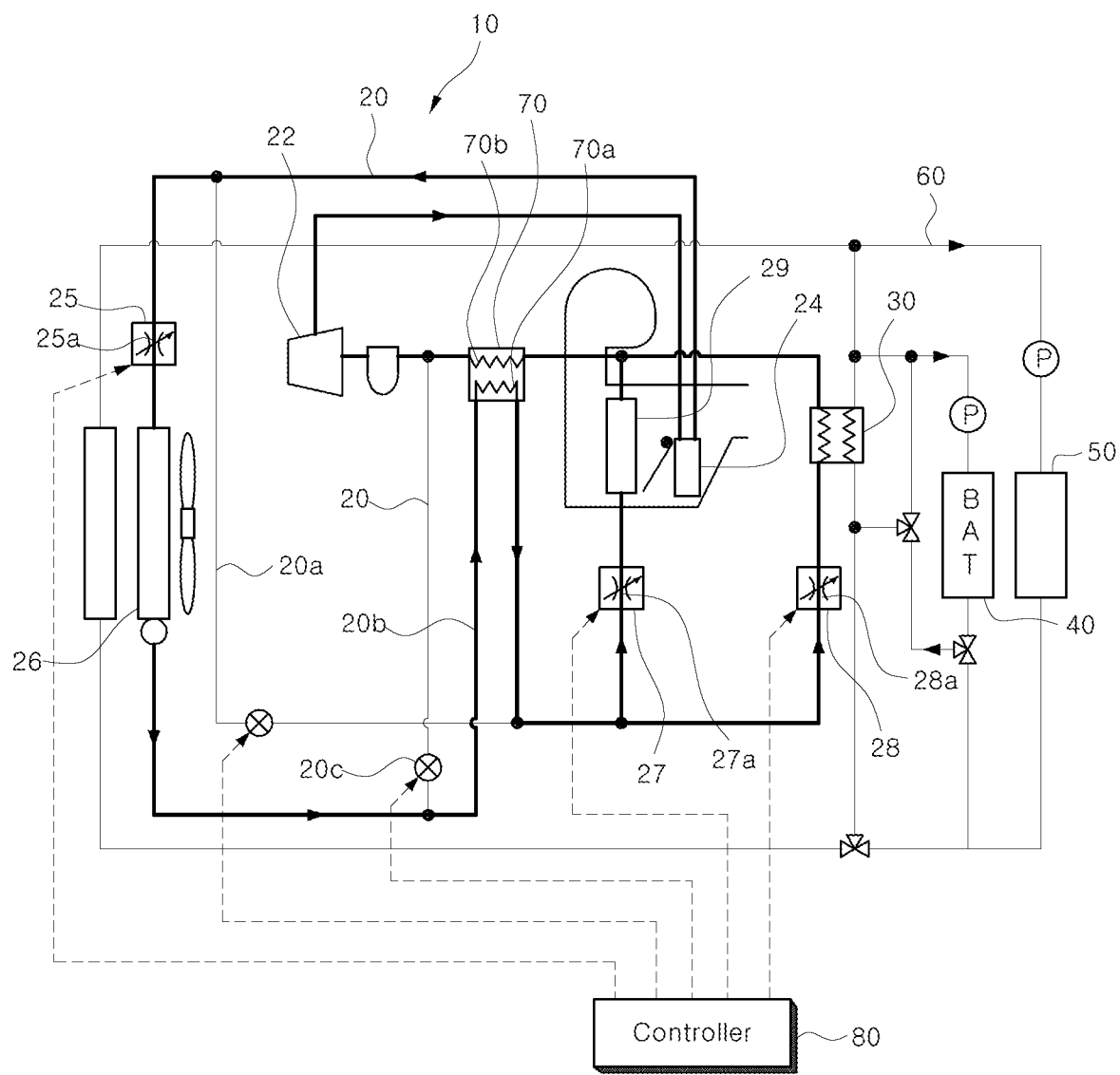
FIG. 6 is a view illustrating an operation example of the vehicular heat management system according to the first embodiment of the present invention, in which a refrigerant flow at the time of simultaneous control in an air conditioning mode and a battery cooling mode is shown.

In addition, when entering the air conditioning mode and the battery cooling mode at the same time, as shown in FIG. 6, the refrigerant flow in the refrigerant circulation line 20 is controlled to connect the outdoor heat exchanger 26 and the first low-pressure side heat exchanger 29 in series and connect the outdoor heat exchanger 26 and the second low-pressure side heat exchanger 30 in series.

Therefore, when simultaneously entering the air conditioning mode and the battery cooling mode, it is possible to physically connect the outdoor heat exchanger 26 and the first low-pressure side heat exchanger 29 and to physically connect the outdoor heat exchanger 26 and the second low-pressure side heat exchanger 30.

Accordingly, when simultaneously entering the air conditioning mode and the battery cooling mode, the refrigerant in the refrigerant circulation line 20 can pass through the outdoor heat exchanger 26 and then can pass through the first low-pressure side heat exchanger 29 and the second low-pressure side heat exchanger 30.

As a result, cold air can be generated from the first low-pressure side heat exchanger 29 and the second low-pressure side heat exchanger 30. Accordingly, it is possible to cool the passenger compartment, the battery 40 and the electric component module 50.

Figure 7:
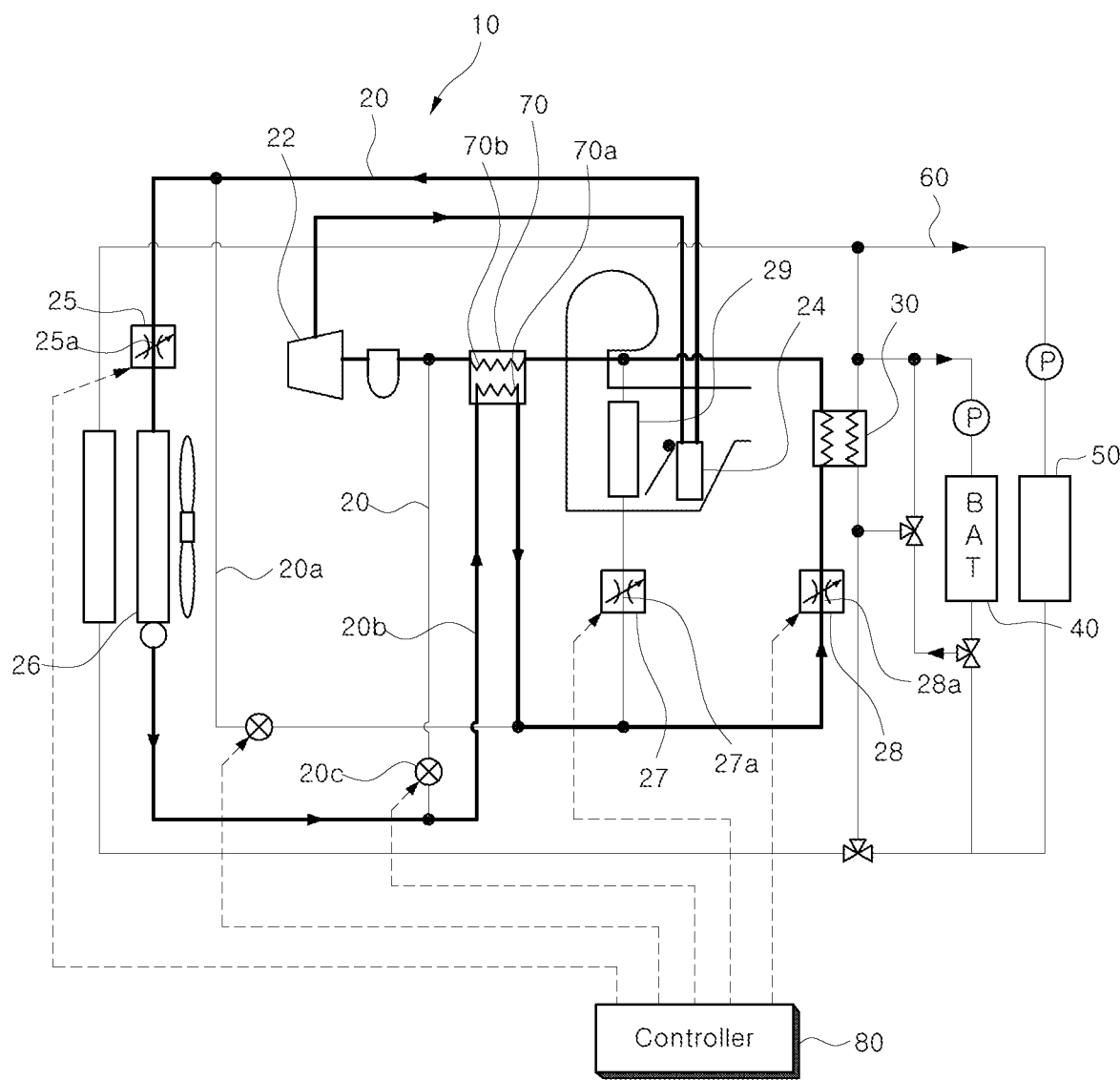
FIG. 7 is a view illustrating an operation example of the vehicular heat management system according to the first embodiment of the present invention, in which a refrigerant flow in a battery cooling mode for fast battery charging is shown.

In addition, in the battery cooling mode for rapid charging of the battery 40, as shown in FIG. 7, the refrigerant flow in the refrigerant circulation line 20 is controlled to connect the outdoor heat exchanger 26 and the second low-pressure side heat exchanger 30 in series.

Therefore, in the battery cooling mode, the outdoor heat exchanger 26 and the second low-pressure side heat exchanger 30 can be physically connected to each other.

Accordingly, in the battery cooling mode, the refrigerant in the refrigerant circulation line 20 can sequentially pass through the outdoor heat exchanger 26 and the second low-pressure side heat exchanger 30, whereby cold air can be generated from the second low-pressure side heat exchanger 30. As a result, it is possible to cool the battery 40.

Figure 8:
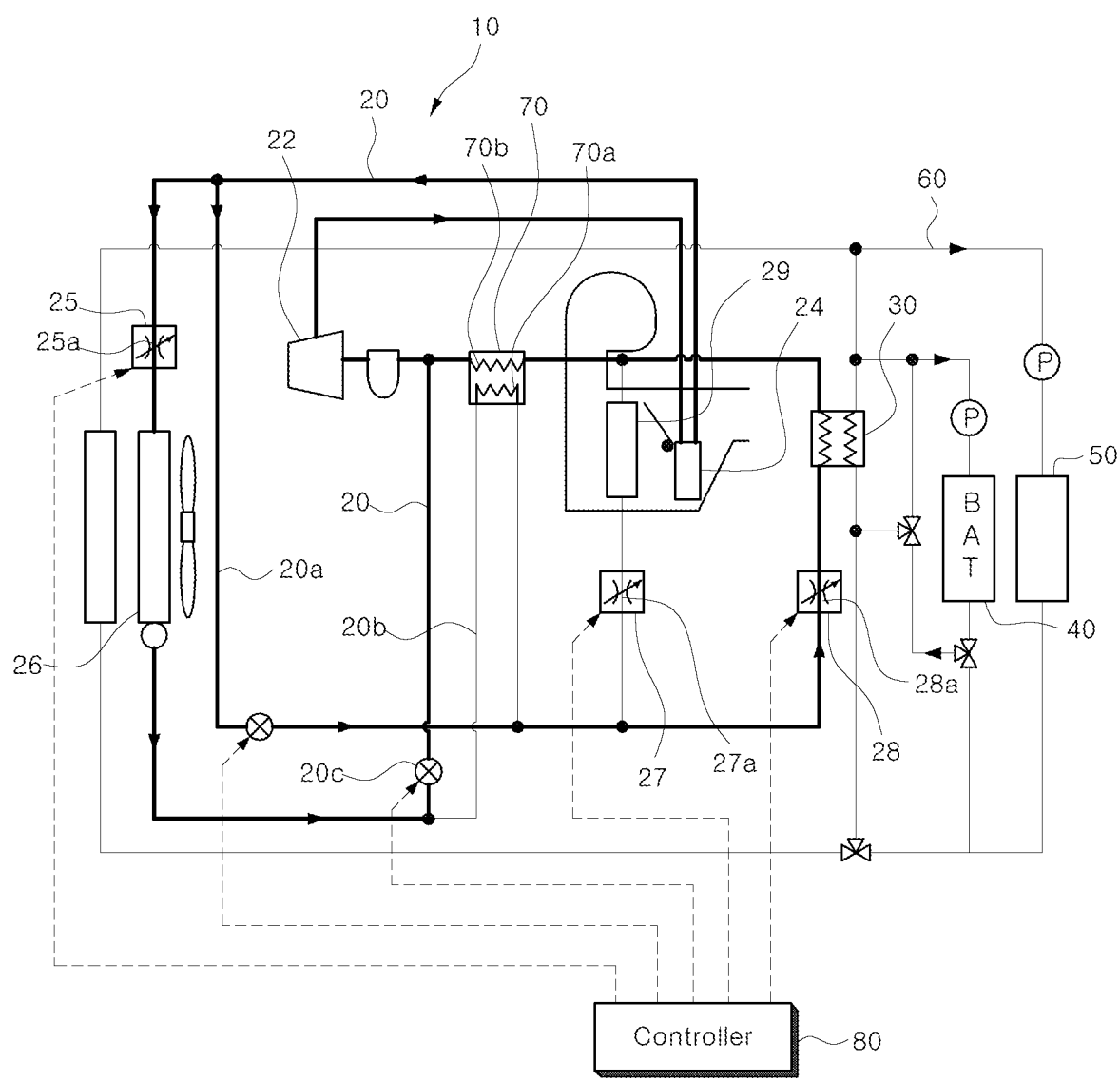
FIG. 8 is a view illustrating an operation example of the vehicular heat management system according to the first embodiment of the present invention, in which a refrigerant flow in a maximum heat pump mode is shown.

Furthermore, in the maximum heat pump mode that requires maximum heating in the passenger compartment, as shown in FIG. 8, the refrigerant flow in the refrigerant circulation line 20 is controlled to connect the outdoor heat exchanger 26 and the second low-pressure side heat exchanger 30 in parallel.

Accordingly, in the maximum heat pump mode, the outdoor heat exchanger 26 and the second low-pressure side heat exchanger 30 are physically independent of each other so that the refrigerant in the refrigerant circulation line 20 can be independently introduced into the outdoor heat exchanger 26 and the second low-pressure side heat exchanger 30. Therefore, the outdoor heat exchanger 26 and the second low-pressure side heat exchanger 30 can be operated independently of each other.

As a result, in the maximum heat pump mode, high-temperature heat is efficiently generated in the high-pressure side heat exchanger 24, and low-temperature cold air is efficiently generated in the second low-pressure side heat exchanger 30.

Accordingly, the high-pressure side heat exchanger 24 and the second low-pressure side heat exchanger 30 can be optimally controlled according to their heat capacities, whereby the high-pressure side heat exchanger 24 and the second low-pressure side heat exchanger 30 can efficiently heat and cool the passenger compartment and the battery 40 while exhibiting optimum cooling/heating performance.

Figure 9:
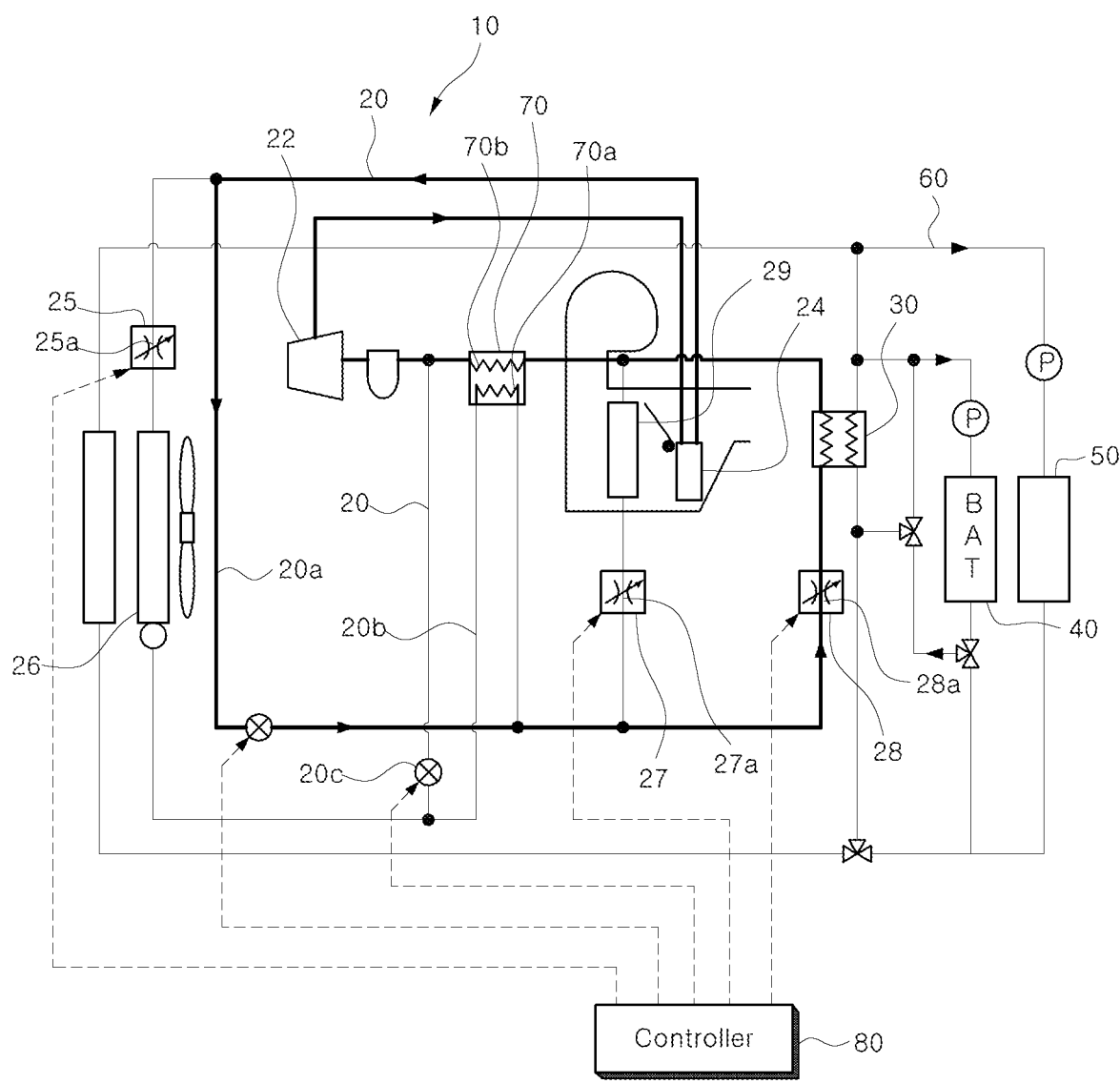
FIG. 9 is a view illustrating an operation example of the vehicular heat management system according to the first embodiment of the present invention, in which a refrigerant flow in a heat exchanger defrosting mode during entry into a heat pump mode is shown.

When the defrosting mode for removing the icing of the outdoor heat exchanger 26 is performed while entering the heat pump mode, as shown in FIG. 9, the refrigerant flow in the refrigerant circulation line 20 is controlled to block the introduction of the refrigerant into the outdoor heat exchanger 26 and permit the introduction of the refrigerant into the second low-pressure side heat exchanger 30.

Accordingly, when the defrosting mode for removing the icing of the outdoor heat exchanger 26 is performed while entering the heat pump mode, the refrigerant in the refrigerant circulation line 20 can be independently introduced only into the second low-pressure side heat exchanger 30. This makes it possible to independently operate only the second low-pressure side heat exchanger 30.

As a result, when the defrosting mode for removing the icing of the outdoor heat exchanger 26 is performed while entering the heat pump mode, the icing of the outdoor heat exchanger 26 is removed, and the cold air of the second low-pressure side heat exchanger 30 is supplied to the battery 40 and the electric component module 50 to cool them.

Figure 10:
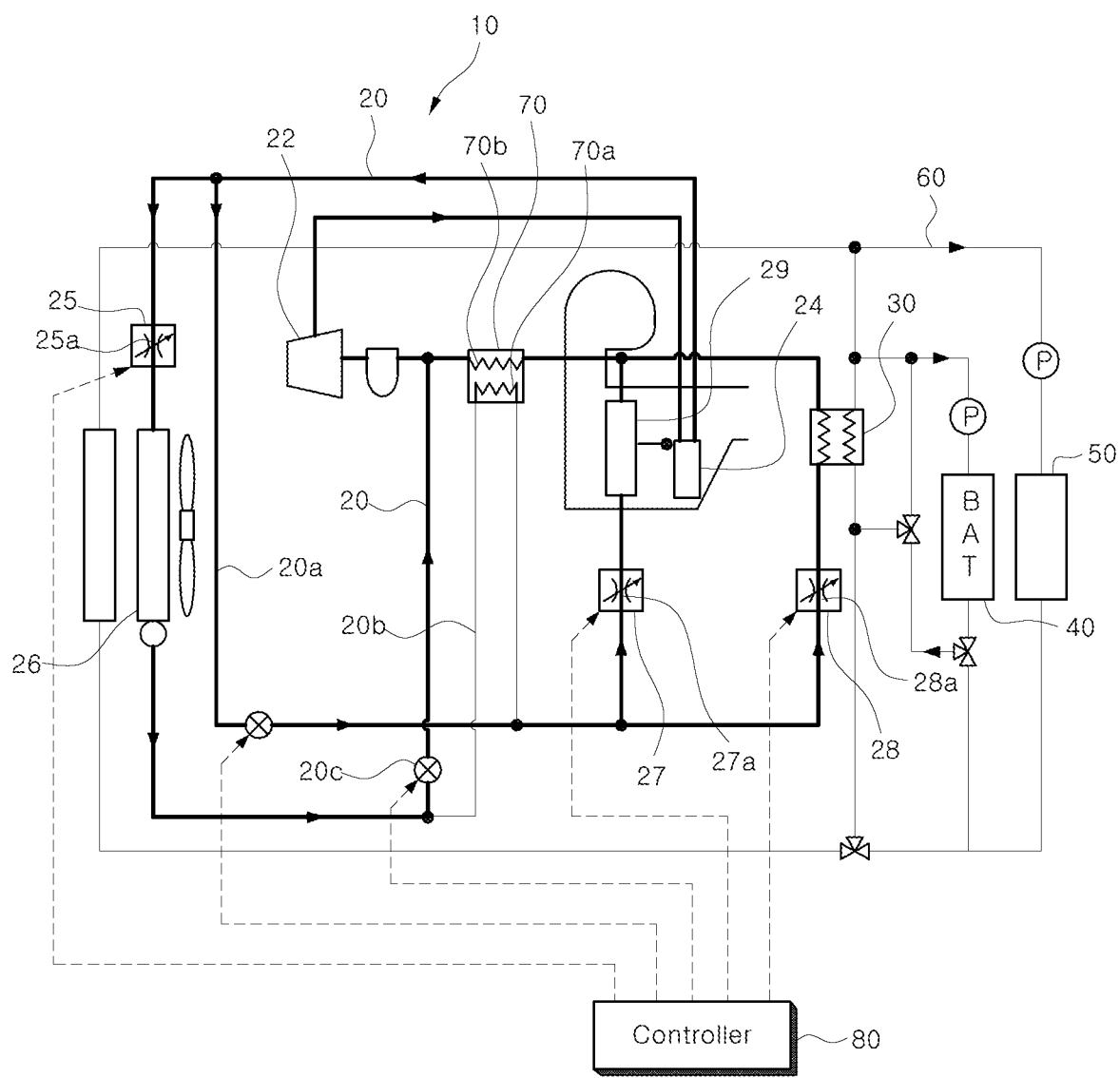
FIG. 10 is a view illustrating an operation example of the vehicular heat management system according to the first embodiment of the present invention, in which a refrigerant flow in a passenger compartment dehumidifying mode during entry into a heat pump mode is shown.

When a passenger compartment dehumidifying mode is performed while entering the heat pump mode, as shown in FIG. 10, the refrigerant flow in the refrigerant circulation line 20 is controlled to connect the outdoor heat exchanger 26 and the first and second low-pressure side heat exchangers 29 and 30 in parallel.

Therefore, when the passenger compartment dehumidifying mode is performed while entering the heat pump mode, the outdoor heat exchanger 26 and the first and second low-pressure side heat exchangers 29 and 30 are all physically independent so that the refrigerant in the refrigerant circulation line 20 can be independently introduced into the outdoor heat exchanger 26 and the first and second low-pressure side heat exchangers 29 and 30. Accordingly, the outdoor heat exchanger 26 and the first and second low-pressure side heat exchangers 29 and 30 can be operated independently of each other.

As a result, when the passenger compartment dehumidifying mode is performed while entering the heat pump mode, high-temperature heat is efficiently generated in the high-temperature heat exchanger 24 to efficiently heat the passenger compartment. Thus, low-temperature cold air is efficiently generated in the first low-pressure side heat exchanger 29 to efficiently remove moisture in the passenger compartment. Also, low-temperature cold air is efficiently generated in the second low-pressure side heat exchanger 30 to efficiently cool the battery 40 and the electric component module 50.

Figure 11:
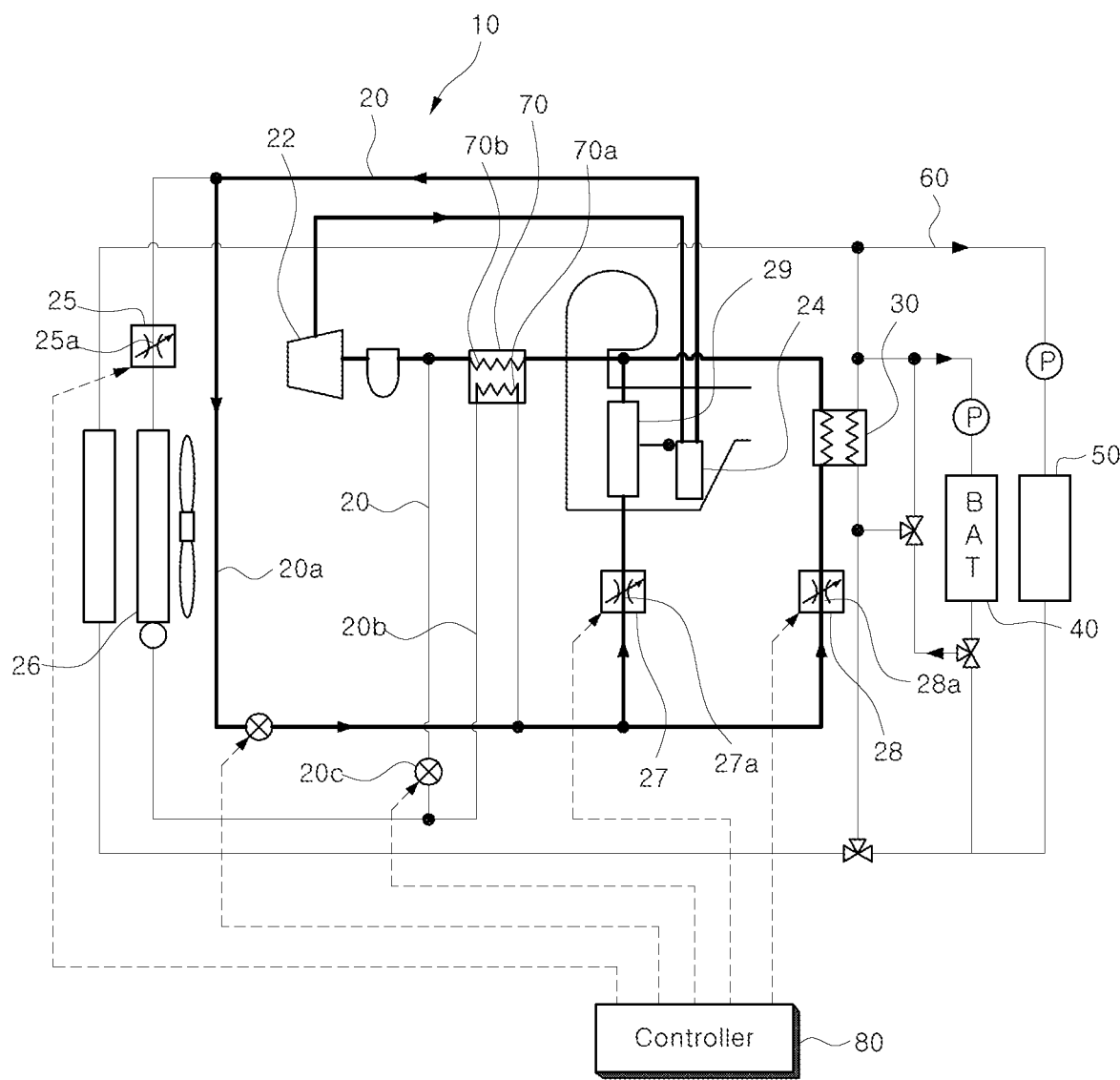
FIG. 11 is a view illustrating an operation example of the vehicular heat management system according to the first embodiment of the present invention, in which a refrigerant flow at the time of simultaneous control in a heat exchanger defrosting mode and a passenger compartment dehumidifying mode during entry into a heat pump mode is shown.

In addition, when the defrosting mode and the passenger compartment dehumidifying mode of the outdoor heat exchanger 26 are performed while entering the heat pump mode, as shown in FIG. 11, the refrigerant flow in the refrigerant circulation line 20 is controlled to block the introduction of the refrigerant into the outdoor heat exchanger 26 and to connect the first and second low-pressure side heat exchangers 29 and 30 in parallel.

Accordingly, when the defrosting mode and the passenger compartment dehumidifying mode of the outdoor heat exchanger 26 are performed while entering the heat pump mode, the refrigerant in the refrigerant circulation line 20 can be independently introduced only into the first and second low-pressure side heat exchangers 29 and 30. This allows the first and second low-pressure side heat exchangers 29 and 30 to be operated independently of each other.

As a result, when the defrosting mode and the passenger compartment dehumidifying mode of the outdoor heat exchanger 26 are performed while entering the heat pump mode, the icing of the outdoor heat exchanger 26 is removed, and the cold air generated in the first and second low-pressure side heat exchangers 29 and 30 is supplied to the passenger compartment, the battery 40 and the electric component module 50, thereby dehumidifying the passenger compartment and cooling the battery 40 and the electric component module 50.

Referring again to FIG. 2, the vehicular heat management system according to the present invention further includes a controller 80 configured to control the refrigerant flow in the refrigerant circulation line 20 by controlling the variable expansion valves 25, 27 and 28, the refrigerant flow control valve 20c and the on/off valve 20a-1 depending on the mode state of the air conditioner 10.

The controller 80 is equipped with a microprocessor. Depending on the mode state of the air conditioner 10, the controller 80 controls the variable expansion valves 25, 27 and 28, the refrigerant flow control valve 20c and the on/off valve 20a-1 to control the refrigerant flow in the refrigerant circulation line 20. Thus, depending on the mode state of the air conditioner 10, the controller 80 connects the outdoor heat exchanger 26 and the first and second low-pressure side heat exchangers 29 and 30 in series or in parallel.

In particular, as shown in FIGS. 5 to 11, depending on the mode state of the air conditioner 10, the controller 80 connects the outdoor heat exchanger 26 and the first and second low-pressure side heat exchangers 29 and 30 in series or in parallel.

Therefore, depending on the mode state of the air conditioner 10, the outdoor heat exchanger 26 may be operated in association with the first low-pressure side heat exchanger 29, or the outdoor heat exchanger 26 may be operated in association with the first low-pressure side heat exchanger 29 and the second low-pressure side heat exchanger 30, or the outdoor heat exchanger 26 may be operated in association with the second low-pressure side heat exchanger 30, or the outdoor heat exchanger 26 may be operated independently of at least one of the first and second low-pressure side heat exchangers 29 and 30.

Accordingly, depending on the mode state of the air conditioner 10, the refrigerant can be introduced into each of the heat exchangers 26, 29 and 30 at optimum flow rates. As a result, the respective heat exchanger 26, 29 and 30 can be controlled optimally.

Second Embodiment

Figure 12:
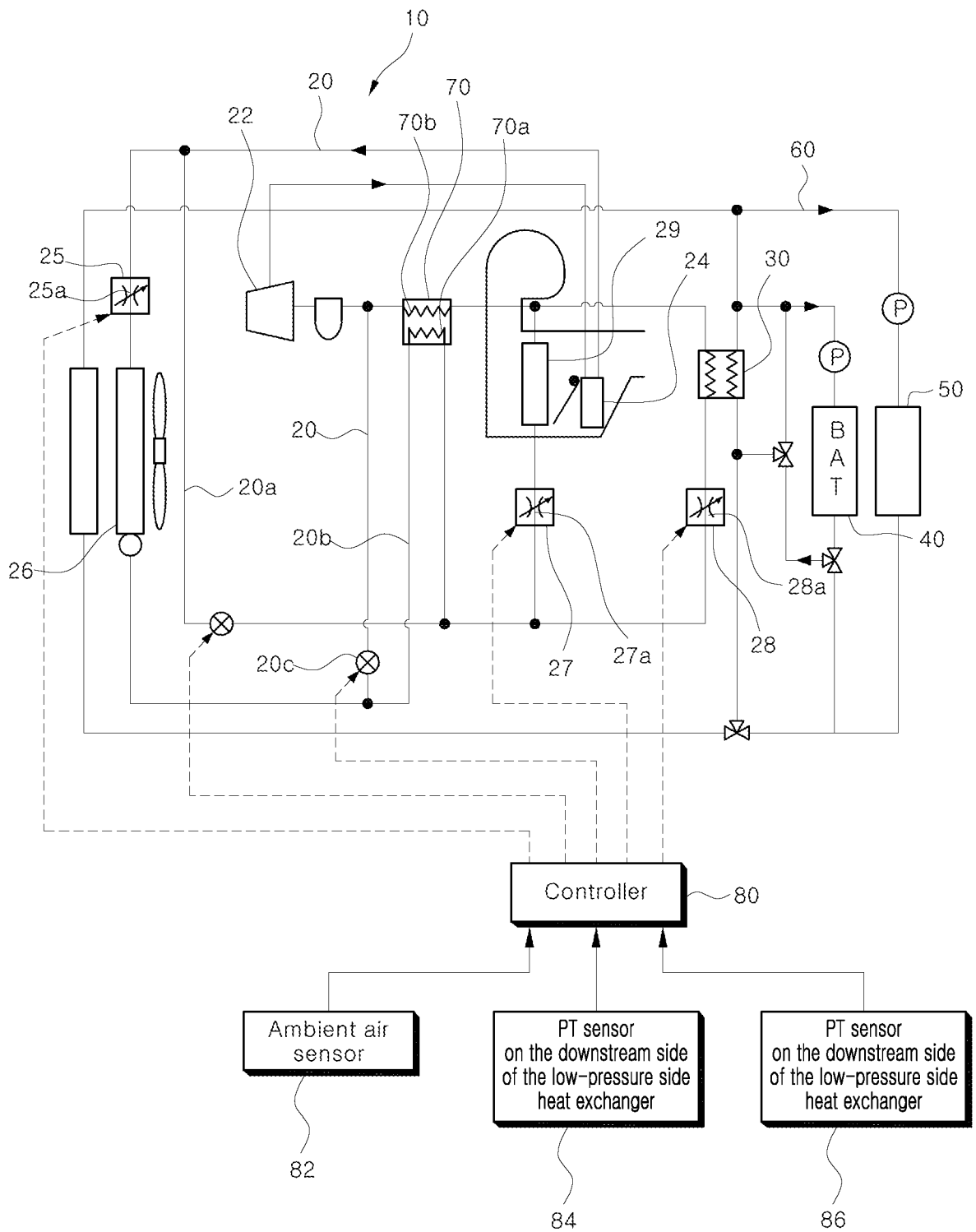
FIG. 12 is a view showing a vehicular heat management system according to a second embodiment of the present invention.

FIG. 12 is a diagram showing a vehicular heat management system according to a second embodiment of the present invention. The vehicular heat management system according to the second embodiment has the same main configuration as that of the vehicular heat management system according to the first embodiment.

As in the first embodiment, depending on the mode state of the air conditioner 10, the outdoor heat exchanger 26 and the first and second low-pressure side heat exchangers 29 and 30 are connected in series or in parallel, whereby the outdoor heat exchanger 26 and the first and second low-pressure side heat exchangers 29 and 30 are operated in association with each other or independently of each other.

However, in the vehicular heat management system according to the second embodiment, the controller 80 variably controls the opening degrees of the variable expansion valves 25, 27 and 28 depending on the cooling/heating load and the overheating degree.

Specifically, in the heat pump mode, the opening degree of the expansion valve 25 on the upstream side of the outdoor heat exchanger 26 is controlled depending on the ambient air temperature inputted from the ambient air sensor 82. For example, the opening degree of the expansion valve 25 is controlled in proportion to the ambient air temperature inputted from the ambient air sensor 82.

In addition, in the air conditioning mode, the opening degrees of the expansion valves 27 and 28 on the upstream side of the first and second low-pressure side heat exchangers 29 and 30 are controlled depending on the refrigerant temperature and the pressure value of the corresponding PT sensors 84 and 86 installed on the downstream side of the first and second low-pressure side heat exchangers 29 and 30, respectively. For example, the opening degrees of the corresponding expansion valves 27 and 28 are controlled in proportion to the refrigerant temperature and the pressure value of the PT sensors 84 and 86.

Third Embodiment

A vehicular heat management system according to a third embodiment of the present invention and an operation example thereof are shown in FIGS. 13 to 16.

Figure 13:
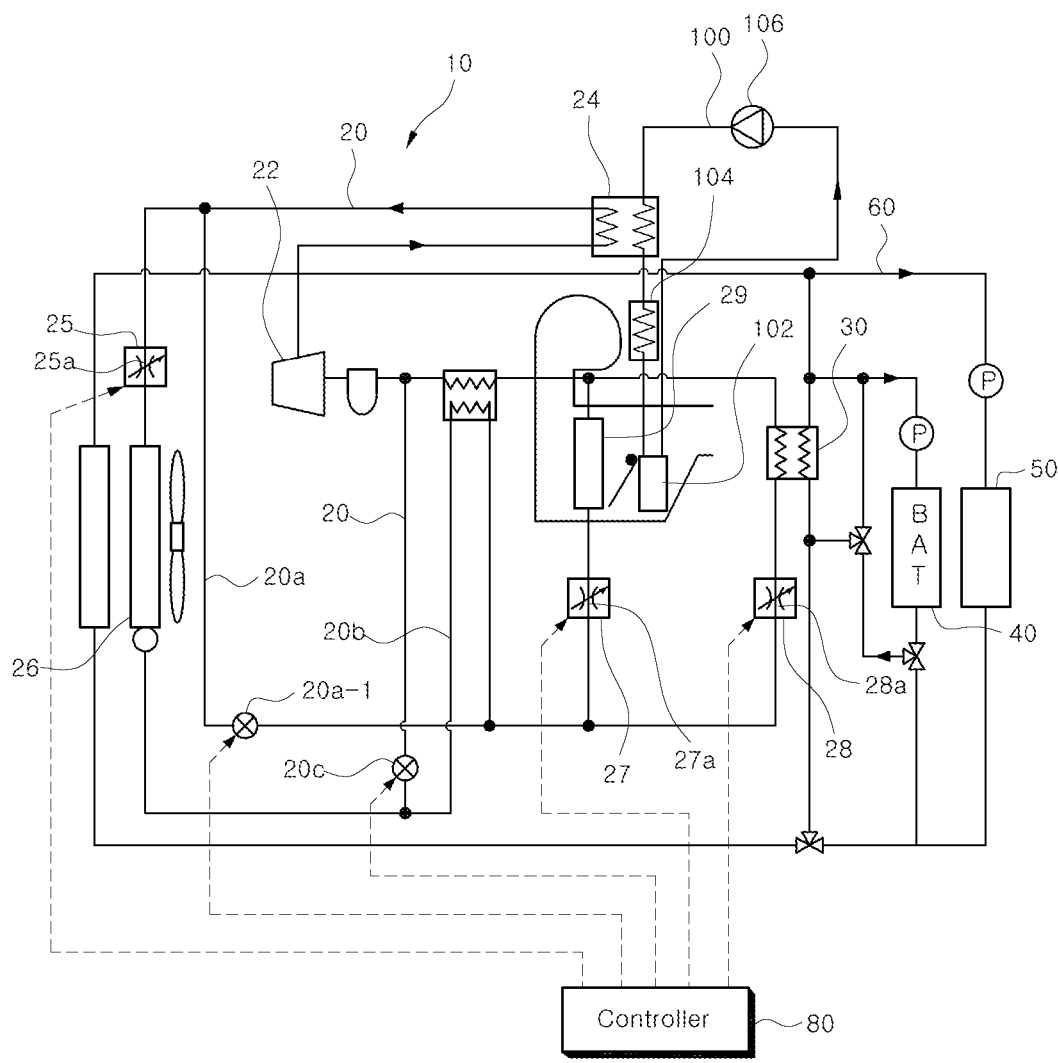
FIG. 13 is a view showing a vehicular heat management system according to a third embodiment of the present invention.

Referring first to FIG. 13, the vehicular heat management system according to the third embodiment has the same main configuration as that of the vehicular heat management system according to the first embodiment.

As in the first embodiment, depending on the mode state of the air conditioner 10, the outdoor heat exchanger 26 and the first and second low-pressure side heat exchangers 29 and 30 are connected in series or in parallel, whereby the outdoor heat exchanger 26 and the first and second low-pressure side heat exchangers 29 and 30 are operated in association with each other or independently of each other.

However, in the vehicular heat management system according to the third embodiment, the heat generated in the high-pressure side heat exchanger 24 of the air conditioner 10 is transferred in a water-cooled manner to a heater core 102 installed inside the passenger compartment.

Specifically, the vehicular heat management system according to the third embodiment includes a heater core side cooling water circulation line 100.

The heater core side cooling water circulation line 100 is configured to connect the high-pressure side heat exchanger 24 of the refrigerant circulation line 20 and the heater core 102 installed inside the passenger compartment in a water-cooled manner. The heater core side cooling water circulation line 100 includes a PTC heater 104 for heating the cooling water by an applied electric current, and a water pump 106 for circulating the cooling water between the high-pressure side heat exchanger 24, the PTC heater 104 and the heater core 102.

Figure 14:
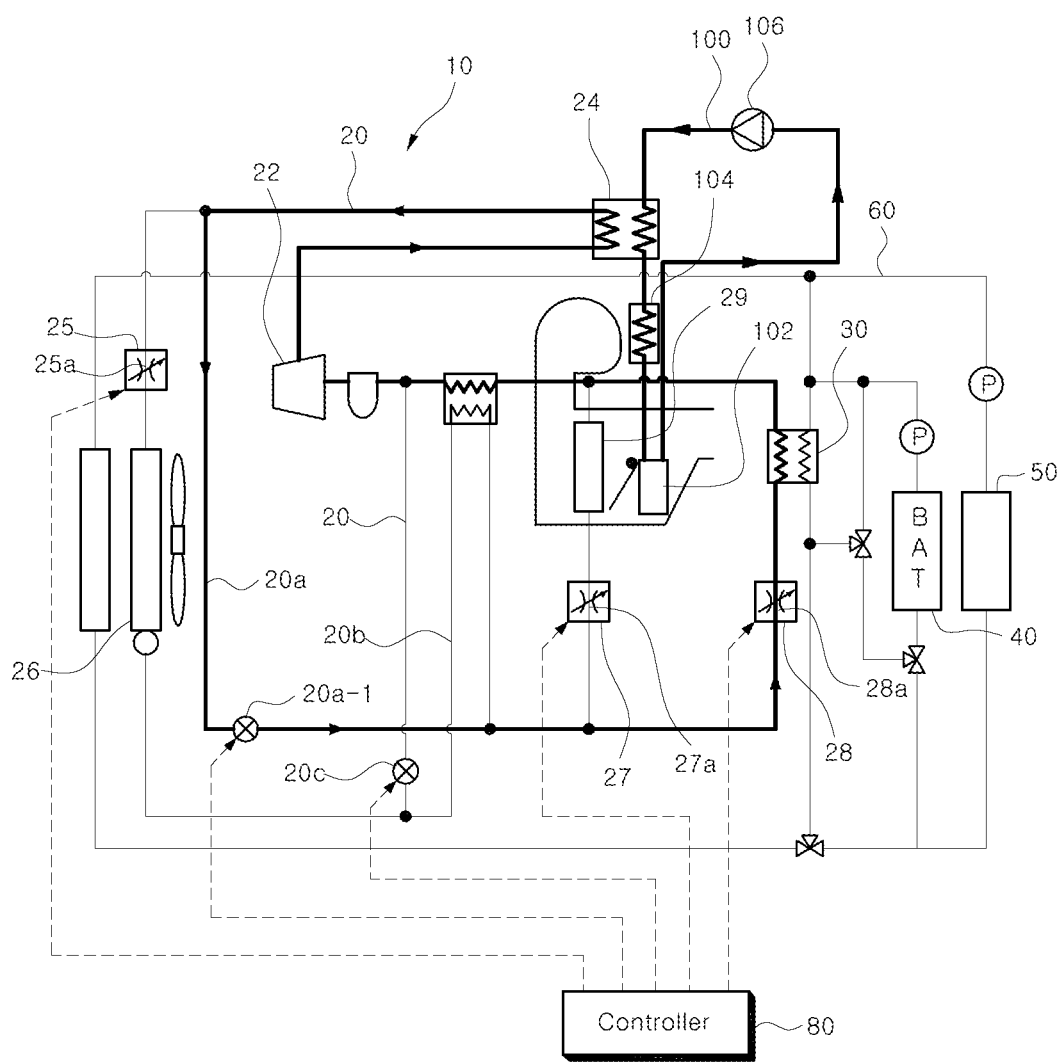
FIG. 14 is a view illustrating an operation example of the vehicular heat management system according to the third embodiment of the present invention, in which a refrigerant flow in a maximum heat pump mode is shown.
Figure 15:
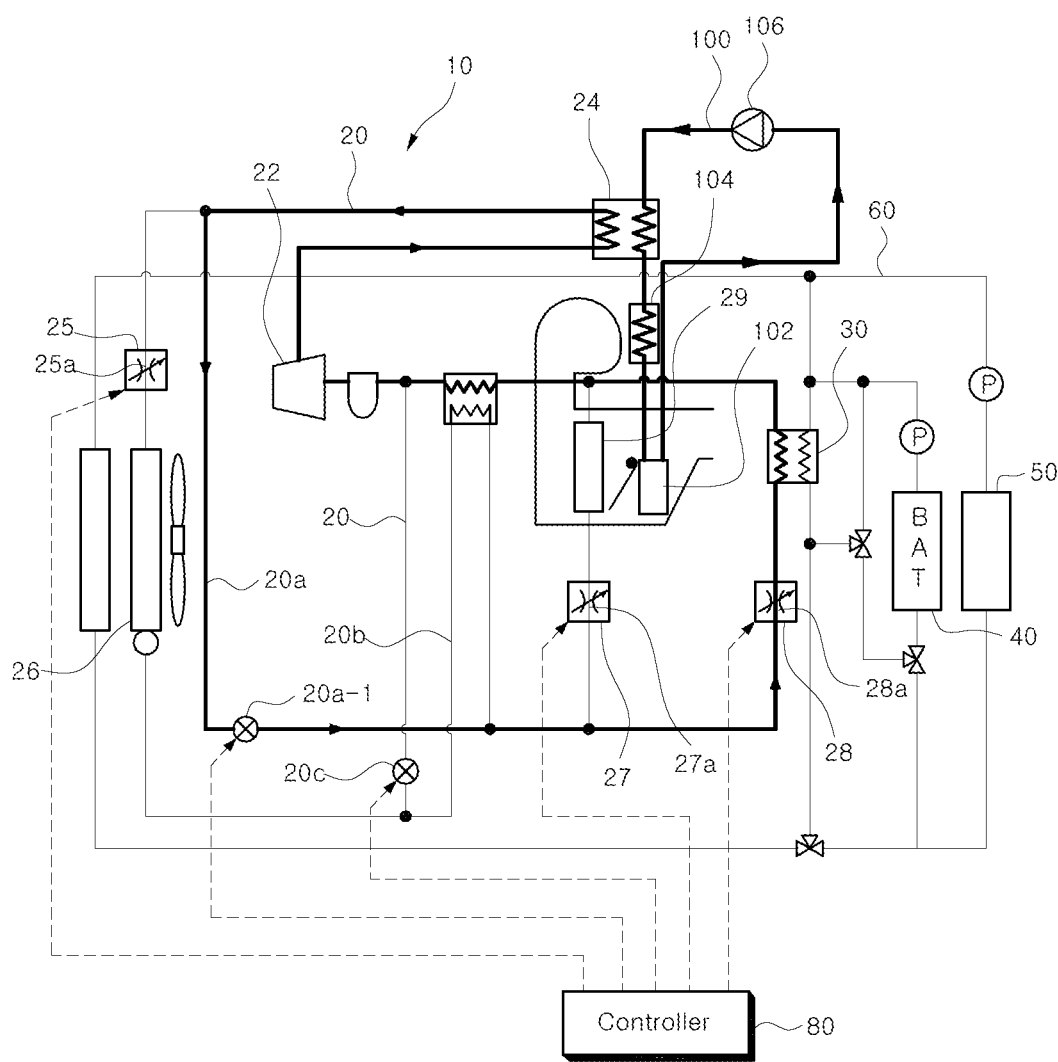
FIG. 15 is a view illustrating an operation example of the vehicular heat management system according to the third embodiment of the present invention, in which a refrigerant flow in a heat exchanger defrosting mode during entry into a heat pump mode is shown.
Figure 16:
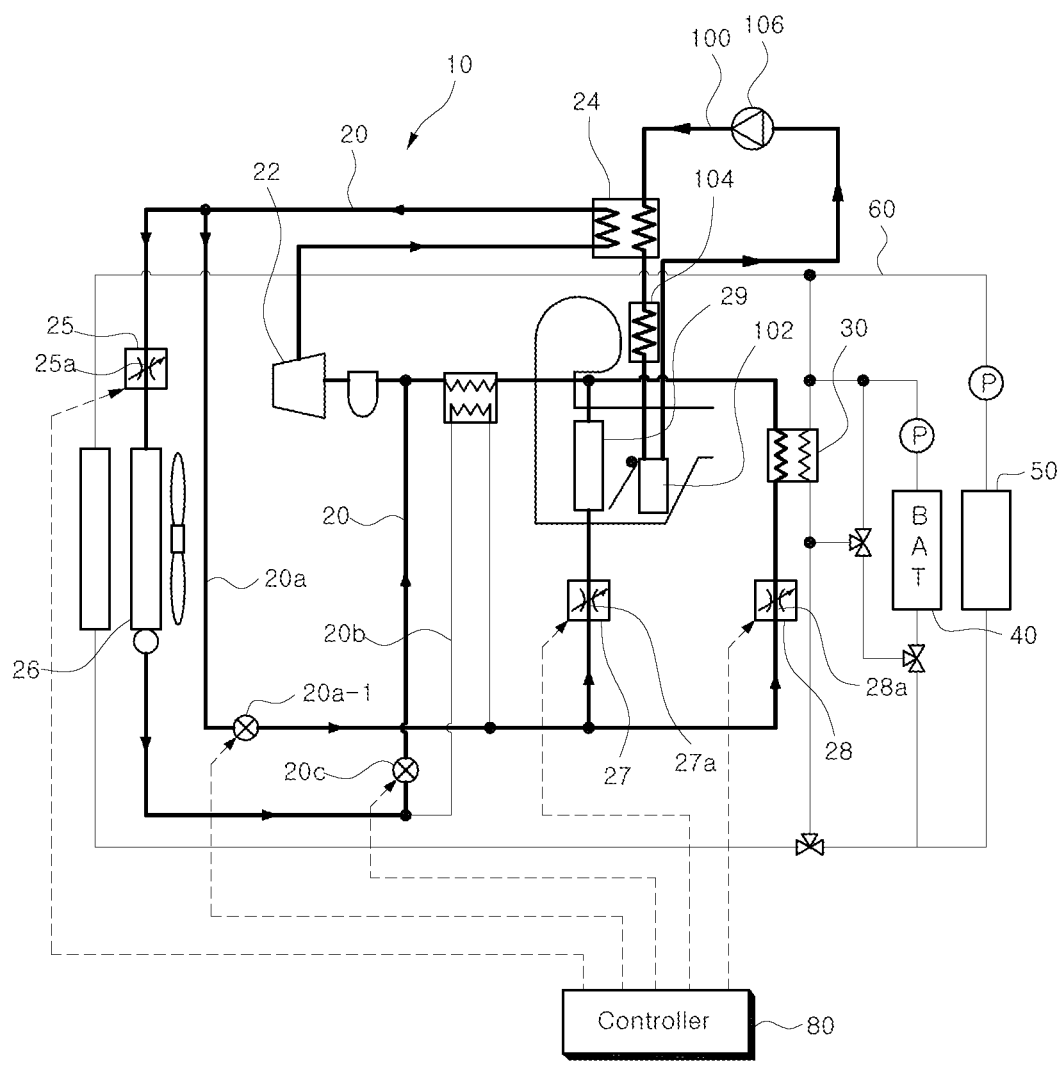
FIG. 16 is a view illustrating an operation example of the vehicular heat management system according to the third embodiment of the present invention, in which a refrigerant flow in a passenger compartment dehumidifying mode during entry into a heat pump mode is shown.

As shown in FIGS. 14 to 16, the heater core side cooling water circulation line 100 receives the heat generated in the high-pressure side heat exchanger 24 of the refrigerant circulation line 20 through the cooling water in the heat pump mode.

Then, the high-temperature cooling water that has received the refrigerant heat is circulated through the heater core 102. Accordingly, the heater core 10 radiates the heat of the cooling water into the passenger compartment, thereby heating the passenger compartment.

That is, in the maximum heat pump mode shown in FIG. 14, the defrosting mode for removing the icing of the outdoor heat exchanger 26 during entry into the heat pump mode shown in FIG. 15, and the passenger compartment dehumidifying mode during entry into the heat pump mode shown in FIG. 16, the heater core side cooling water circulation line 100 receives the heat generated from the high-pressure side heat exchanger 24 through the cooling water.

Then, the high-temperature cooling water that has received the refrigerant heat is circulated through the heater core 102 to heat the passenger compartment.

According to the vehicular heat management system of the present invention having such a configuration, depending on the mode state of the air conditioner 10, the refrigerant flow between the outdoor heat exchanger 26 and the first and second low-pressure side heat exchangers 29 and 30 is controlled in series or in parallel. Therefore, the flow rates of the refrigerant introduced into the respective heat exchangers 26, 29 and 30 can be independently controlled depending on the mode state of the air conditioner 10.

Furthermore, since the flow rates of the refrigerant introduced into the respective heat exchangers 26, 29 and 30 can be independently controlled, it is possible to introduce the refrigerant into the respective heat exchangers 26, 29 and 30 at optimum flow rates.

In addition, since the refrigerant can be introduced into the respective heat exchangers 26, 29 and 30 at optimum flow rates, it is possible to optimally control the respective low-pressure side heat exchanger 29 and 30. As a result, the respective low-pressure side heat exchangers 29 and 30 significantly improve cooling/heating performance of the air conditioner 10 while exhibiting optimal cooling/heating performance.

While the preferred embodiments of the present invention have been described above, the present invention is not limited to the above-described embodiments. Various modifications and changes may be made without departing from the scope and spirit of the present invention defined in the claims.

What is claimed is:

1. A vehicular heat management system provided with a heat pump type refrigerant circulation line that cools and heats specific air conditioning regions by generating hot air or cold air depending on a flow direction of a refrigerant, comprising:
   a compressor configured to suck, compress and discharge the refrigerant;
   a high-pressure side heat exchanger configured to dissipate heat of the refrigerant discharged from the compressor;
   an outdoor heat exchanger configured to allow the refrigerant to exchange heat with an air outside the vehicle;
   an expansion valve configured to depressurize the refrigerant flowing out of the high-pressure side heat exchanger or the outdoor heat exchanger; and
   one or more low-pressure side heat exchangers configured to evaporate the depressurized refrigerant,
   wherein the outdoor heat exchanger and the low-pressure side heat exchangers are connected in series or in parallel depending on an air conditioning mode.

2. The system of claim 1, wherein the outdoor heat exchanger and the low-pressure side heat exchangers are connectable in parallel to each other on the refrigerant circulation line to operate independently of each other and are connectable in series to each other to operate in association with each other.

3. The system of claim 2, wherein the outdoor heat exchanger is installed on the refrigerant circulation line, and the low-pressure side heat exchangers are installed in parallel on a branch refrigerant line branched from the refrigerant circulation line and are connected in parallel with the outdoor heat exchanger on the refrigerant circulation line.

4. The system of claim 3, further comprising:
   a connection refrigerant line configured to connect the refrigerant circulation line on the downstream side of the outdoor heat exchanger and the branch refrigerant line on the upstream side of the low-pressure side heat exchangers,
   wherein the connection refrigerant line is configured to connect the outdoor heat exchanger of the refrigerant circulation line and the low-pressure side heat exchangers of the branch refrigerant line in series.

5. The system of claim 4, further comprising:
   a refrigerant flow controller configured to, depending on an air conditioning mode, control a refrigerant flow between the outdoor heat exchanger of the refrigerant circulation line and the low-pressure side heat exchangers of the branch refrigerant line in series or in parallel.

6. The system of claim 5, wherein the refrigerant flow controller includes:
   variable expansion valves respectively installed on the upstream side of the outdoor heat exchanger and the low-pressure side heat exchangers to permit or block introduction of the refrigerant into the outdoor heat exchanger and the low-pressure side heat exchangers;
   an on/off valve installed in the branch refrigerant line to permit or block a refrigerant flow in a parallel structure of the low-pressure side heat exchangers of the branch refrigerant line with respect to the outdoor heat exchanger of the refrigerant circulation line;
   a refrigerant flow control valve installed in the refrigerant circulation line to permit or block a refrigerant flow in a series structure of the outdoor heat exchanger of the refrigerant circulation line and the low-pressure side heat exchangers of the branch refrigerant line; and
   a controller configured to control the variable expansion valves, the on/off valve and the refrigerant flow control valve so that the refrigerant flow between the outdoor heat exchanger of the refrigerant circulation line and the low-pressure side heat exchangers of the branch refrigerant line is controlled in series or in parallel depending on the air conditioning mode.

7. The system of claim 6, wherein the outdoor heat exchanger of the refrigerant circulation line is installed on the side of an engine room, and one of the low-pressure side heat exchangers of the branch refrigerant line is used for cooling a passenger compartment while the other is used for cooling a battery.

8. The system of claim 7, wherein the controller is configured to, in a maximum air conditioning mode, control the variable expansion valves, the on/off valve and the refrigerant flow control valve to permit a refrigerant flow in a series structure of the outdoor heat exchanger and the low-pressure side heat exchanger for cooling the passenger compartment.

9. The system of claim 8, wherein the controller is configured to, when simultaneously entering an air conditioning mode and a battery cooling mode, control the variable expansion valves, the on/off valve and the refrigerant flow control valve to permit a refrigerant flow in a series structure of the outdoor heat exchanger and the low-pressure side heat exchanger for cooling the passenger compartment and a refrigerant flow in a series structure of the outdoor heat exchanger and the low-pressure side heat exchanger for cooling the battery.

10. The system of claim 9, wherein the controller is configured to, in a battery cooling mode for fast cooling the battery, control the variable expansion valves, the on/off valve and the refrigerant flow control valve to permit a refrigerant flow in a series structure of the outdoor heat exchanger and the low-pressure side heat exchanger for cooling the battery.

11. The system of claim 10, wherein the controller is configured to, in a maximum heat pump mode, control the variable expansion valves, the on/off valve and the refrigerant flow control valve to permit a refrigerant flow in a series structure of the outdoor heat exchanger and the low-pressure side heat exchanger for cooling the battery.

12. The system of claim 11, wherein the controller is configured to, when a defrosting mode for removing the icing of the outdoor heat exchanger is performed during entry into a heat pump mode, control the variable expansion valves, the on/off valve and the refrigerant flow control valve to block introduction of the refrigerant into the outdoor heat exchanger and to permit an independent refrigerant flow through the low-pressure side heat exchanger for cooling the battery.

13. The system of claim 12, wherein the controller is configured to, when a passenger compartment dehumidifying mode is performed during entry into the heat pump mode, control the variable expansion valves, the on/off valve and the refrigerant flow control valve to permit a refrigerant flow in a parallel structure of the outdoor heat exchanger, the low-pressure side heat exchanger for cooling the passenger compartment and the low-pressure side heat exchanger for cooling the battery.

14. The system of claim 13, wherein the controller is configured to, when the defrosting mode for removing the icing of the outdoor heat exchanger and the passenger compartment dehumidifying mode are simultaneously performed during entry into the heat pump mode, control the variable expansion valves, the on/off valve and the refrigerant flow control valve to block introduction of the refrigerant into the outdoor heat exchanger and to permit a refrigerant flow in a parallel structure of the low-pressure side heat exchanger for cooling the passenger compartment and the low-pressure side heat exchanger for cooling the battery.

15. The system of claim 14, wherein the controller is configured to variably control the variable expansion valves depending on a cooling/heating load and an overheating degree.

16. The system of claim 15, wherein the controller is configured to control opening degrees of the expansion valves on the upstream side of the outdoor heat exchanger depending on ambient air temperature inputted from ambient air sensor and to control opening degrees of the expansion valves on the upstream side of the low-pressure side heat exchangers for cooling the passenger compartment and the battery depending on refrigerant temperature and pressure value of PT sensors installed on the downstream side of the low-pressure side heat exchangers for cooling the passenger compartment and the battery.

17. The system of claim 7, further comprising:
an internal heat exchanger configured to allow high-temperature refrigerant supplied from the outdoor heat exchanger to the low-pressure side heat exchangers for cooling the passenger compartment and the battery to exchange heat with low-temperature refrigerant supplied from transferred from the low-pressure side heat exchangers for cooling the passenger compartment and the battery to the compressor, when at least one of a set of the outdoor heat exchanger and the low-pressure side heat exchanger for cooling the passenger compartment and a set of the outdoor heat exchanger and the low-pressure side heat exchanger for cooling the battery is connected in series.

18. The system of claim 7, wherein the low-pressure side heat exchanger for cooling the battery is used for cooling an electric component module, and the battery and the electric component module are connected in a water-cooled manner to the low-pressure side heat exchanger for cooling the battery through a cooling water circulation line so that the battery and the electric component module are cooled by receiving heat energy from the low-pressure side heat exchanger for cooling the battery through the cooling water circulated along the cooling water circulation line.

19. The system of claim 18, wherein the battery and the electric component module are installed on the cooling water circulation line so that the battery and the electric component module are connected in parallel to each other with respect to the low-pressure side heat exchanger for cooling the battery.

20. The system of claim 1, further comprising:
a heater core side cooling water circulation line configured to heat the passenger compartment by transferring the heat of the refrigerant generated in the refrigerant circulation line to a heater core installed in the passenger compartment in a water-cooled manner.

21. The system of claim 20, wherein the heater core side cooling water circulation line is configured to circulate the cooling water between the high-pressure side heat exchanger of the refrigerant circulation line and the heater core so that the heat of the refrigerant in the refrigerant circulation line dissipated from the high-pressure side heat exchanger is transferred to the cooling water is introduced into the heater core.

22. The system of claim 21, wherein the heater core side cooling water circulation line further includes a PTC heater operated by an applied electric current to heat the cooling water circulated to the heater core, and a water pump configured to forcedly circulate the cooling water between a water-cooled heat exchanger of the refrigerant circulation line, the heater core and the PTC heater.

* * * * *